(12) United States Patent
Raizen

(10) Patent No.: US 9,069,481 B1
(45) Date of Patent: Jun. 30, 2015

(54) AUTOMATED NON-DISRUPTIVE DATA ENCAPSULATION AND DE-ENCAPSULATION

(71) Applicant: EMC Corporation, Hopkinton, MA (US)

(72) Inventor: Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 125 days.

(21) Appl. No.: 13/962,449

(22) Filed: Aug. 8, 2013

Related U.S. Application Data

(60) Provisional application No. 61/840,562, filed on Jun. 28, 2013.

(51) Int. Cl.
*G06F 12/12* (2006.01)
*G06F 3/06* (2006.01)

(52) U.S. Cl.
CPC ............ *G06F 3/0647* (2013.01); *G06F 12/121* (2013.01); *G06F 3/0619* (2013.01); *G06F 3/0689* (2013.01)

(58) Field of Classification Search
CPC ... G06F 3/0689; G06F 3/0647; G06F 3/0619; G06F 12/121

USPC .......................................................... 711/114
See application file for complete search history.

(56) References Cited

U.S. PATENT DOCUMENTS

| 6,058,455 A * | 5/2000 | Islam et al. .................... 711/114 |
| 6,968,369 B2 * | 11/2005 | Veprinsky et al. ............ 709/219 |
| 7,657,578 B1 * | 2/2010 | Karr et al. ..................... 707/610 |
| 2002/0091991 A1 * | 7/2002 | Castro ........................... 717/106 |

* cited by examiner

*Primary Examiner* — Jae Yu
(74) *Attorney, Agent, or Firm* — BainwoodHuang

(57) ABSTRACT

A host computer automatically detects an encapsulating volume in a not ready device state and executes setup and synchronize operations, where the encapsulating volume is a virtualization of a physical volume. Setup applies access control to the encapsulating volume, and synchronize transitions the encapsulating volume to a protected device state. In response to a signal conveying an administrator's instruction to proceed, a commitment operation is automatically executed by atomically (a) removing the access control on the encapsulating volume to allow application access, (b) applying access control to the physical volume, and (c) remapping a device name to reference the encapsulating volume, the commitment operation also causing a transition of the encapsulating volume to a normal device state in which the encapsulating volume is available for normal application access. The technique can also include de-encapsulation and a data migration process employing the encapsulation and de-encapsulation.

20 Claims, 6 Drawing Sheets

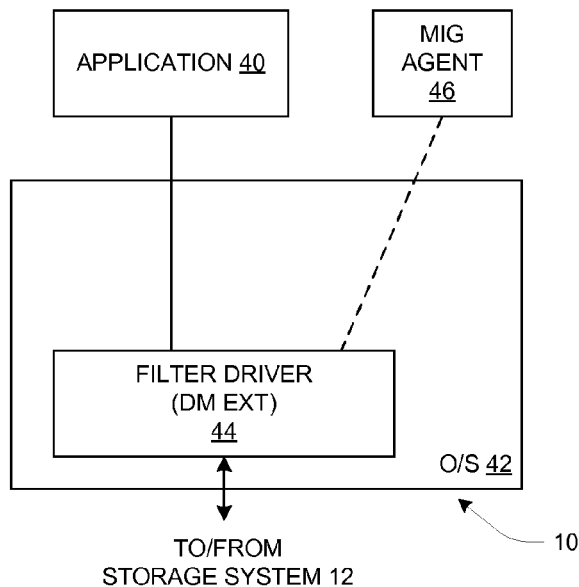
Fig. 4
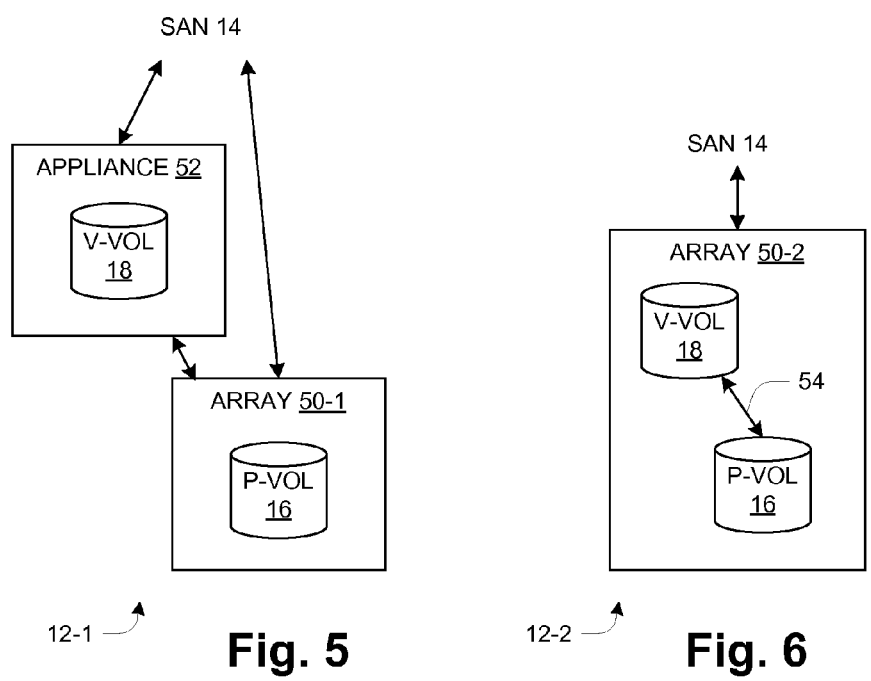
Fig. 5     Fig. 6

AUTOMATED NON-DISRUPTIVE DATA ENCAPSULATION AND DE-ENCAPSULATION

BACKGROUND

The invention is related to the field of data storage.

Techniques for data migration and for device encapsulation in data storage systems are generally known.

U.S. Pat. No. 7,809,912 of Bappe et al. describes methods and systems for minimizing disruptions when host data on a source logical storage unit is migrated to a target logical unit. I/O requests are managed in a particular order during various states of the migration. After the target logical unit is synchronized with the source logical unit and before a commitment to the target logical unit is made, the target logical unit can be evaluated. At that point, the migration can be aborted if necessary. During the evaluation of the target logical unit, I/O requests that were directed to the source logical unit are redirected to the target logical unit and I/O requests that were directed to the target logical unit are redirected to the source logical unit. The disclosed methods and systems can also be used for less-disruptive virtualization of a source logical unit as a target logical unit. One feature of the disclosed methods is that a user can control, using among other things a program running in user space and a filter driver, a migration through transitions between different stages or "states." The program provides a user interface via which the user provides high-level commands such as "Setup", Synchronize", etc. as more particularly described in the '912 patent.

U.S. Pat. No. 8,332,613 of Glade et al. describes a particular use of the technique of the '912 patent for minimizing disruptions when host data on a physical volume is encapsulated into or de-encapsulated from a virtualization layer. One common use for encapsulation is to speed up the process of transitioning a storage volume into network virtualized storage by avoiding data copies. Other common reasons include avoiding the need for additional storage during a data migration process. The act of transitioning storage from array-based storage to network virtualized storage allows that storage to gain the benefits provided by network virtualized storage including inter-array replication, application transparent data mobility, and flexibility in the quality of service provided for a volume for example.

U.S. Pat. No. 7,904,681 of Bappe et al. describes methods and systems that enable data migration from a source logical volume to a target logical volume in signal communication with the source logical volume with minimal disruption to the accessibility of that data. The coherency of data on the source logical volume and the target logical volume is confirmed. As part of the migration operation, a pseudoname is remapped from a source logical volume identifier to a target logical volume identifier, enabling application access to continue and avoiding any stopping or reconfiguring of applications accessing the stored data.

SUMMARY

One feature of known techniques such as those of the '912 and '613 patents discussed above is their involvement of a human user such as a system administrator to provide the high-level control commands (Setup, Synchronize, etc.) for a migration or encapsulation process. This requirement may be problematic in some cases. As one example, in a service-provider (SP)-tenant computing environment, an SP organization responsible for providing storage resources may utilize migration or encapsulation processes to deploy and manage the resources. To the extent these processes require operations to be performed at tenant-controlled host computers, such operations would require involvement of tenant personnel such as a host system administrator. However, in the ideal SP-tenant environment, tenants operate as independently of the SP as possible and are not subject to a requirement to actively support SP-specific operations such as management of the storage resources.

Thus a technique is disclosed by which certain operations of a host computer in connection with data encapsulation are automated. Automation of the host computer operations generally enhances the ease of use of an encapsulation process however it may be used, and in particular can better support operating environments like the SP-tenant environment in which it is necessary to avoid or reduce the involvement of a host system administrator in support of storage system operations like encapsulation and data migration.

In particular, a disclosed method of operating a host computer includes, in a first step, automatically detecting an encapsulating volume in a not ready device state and executing setup and synchronize operations, the encapsulating volume being a virtualization of a physical volume referenced by applications using a device name mapped thereto. The setup operation applies access control to the encapsulating volume to initially prevent application access to the encapsulating volume, and the synchronization operation causes a transition of the encapsulating volume to a protected device state in which the encapsulating volume is ready for storage operations but the access control is maintained to continue preventing application access to the encapsulating volume.

In a second step performed in response to a signal conveying an administrator's instruction to proceed, a commitment operation is automatically executed by atomically (a) removing the access control on the encapsulating volume to allow application access thereto, (b) applying access control to the physical volume to prevent subsequent application access to the physical volume, and (c) remapping the device name to reference the encapsulating volume, the commitment operation also causing a transition of the encapsulating volume to a normal device state in which the encapsulating volume is available for normal application access.

In one embodiment the administrator may be an SP administrator of a service provider (SP) in an SP-tenant environment, and the disclosed technique enables the SP to manage storage resources without involvement of tenant personnel. The signal that controls execution of the second step can be an explicit signal, using some form of messaging protocol for example, or it can be a more implicit type of indication such as a predetermined device state change of the virtual volume that is visible to the host and that can be controlled/manipulated by the SP administrator. While the actions are automated at the host computer and thus reduce or eliminate the need for involvement of a host system administrator, at the same time the use of signaling from an SP administrator maintains human control over the encapsulation, providing desired flexibility and robustness in the execution of the operations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 4 is a schematic diagram of certain operating software of a host computer;

FIGS. 5 and 6 are alternative organizations of a storage system;

DETAILED DESCRIPTION

Figure 1:
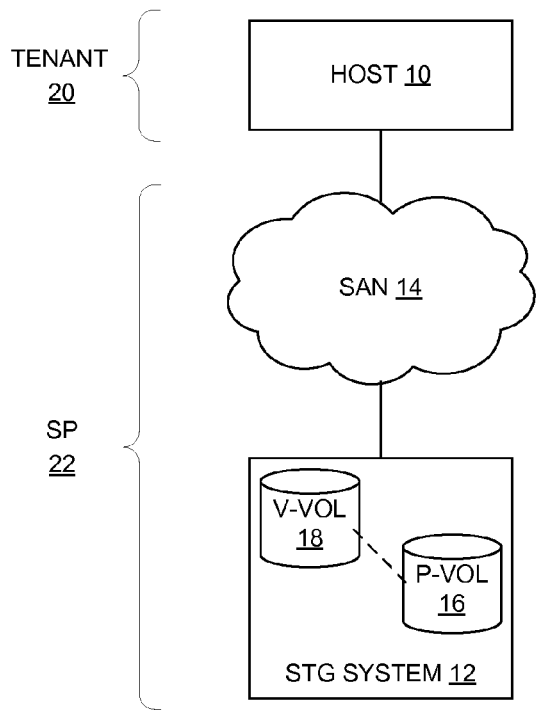
FIG. 1 is a block diagram of a data processing system.

FIG. 1 shows a computer system including a host computer (HOST) 10 and a storage system (STG SYSTEM) 12 coupled to each other via a storage-area network (SAN) 14. The storage system 12 provides secondary storage of data for the host 10 on a physical volume (P-VOL) 16 and a virtual volume (V-VOL) 18. For ease of description only one of each volume type 16, 18 is shown, but it will be understood that in general a storage system may include numerous volumes of either or both types. The storage system 12 may have different types of configurations and components, examples of which are described below. The host 10 may be a server-style computer as generally known in the art. The SAN 14 is a local-area storage-oriented network, also as generally known in the art. In alternative embodiments some other type of network connecting the host 10 to the storage system 12 may be employed, such as an Internet Protocol (IP) network over which a storage protocol such as iSCSI is employed.

FIG. 1 shows the host 10 being associated with a tenant 20 while the storage system 12 is associated with a service provider (SP) 22. One use case for the presently disclosed technique is an environment in which a tenant organization (tenant 20) deploys applications on a host 10 that is in a data center operated by a different entity, referred to as the "service provider" or SP 22. The SP 22 provides various resources for use by the tenant, typically along with other tenants (not shown) as well. This arrangement has certain economies and operational benefits that are attractive to the participants. In the illustrated example, the resources provided by the SP 22 include the storage system 12. The SP 22 is responsible for providing storage resources to the tenant 20 as may be specified in a contract, for example, and this obligation is met through deployment and configuration of the virtual volumes 18 and physical volumes 16 in the storage system 12.

The description below refers to an "SP administrator" performing various actions. An SP administrator is a human administrator responsible for operation of the SP-provided components, e.g., SAN 14 and storage system 12 in FIG. 1.

In the storage system 12, the virtual volume 18 and physical volume 16 have a special relationship indicated in FIG. 1 by a dashed line between them. Specifically, a technique known as "encapsulation" is employed in which the virtual volume 18 encapsulates the physical volume 16. In this relationship, the virtual volume 18 serves as a point of access for data that is physically stored on the physical volume 16. The virtual volume 18 has the attributes of a storage device or volume as seen by the host 10, and these attributes in general may be distinct from the attributes of the physical volume 16.

Encapsulation is used for a variety of system-level purposes as generally known in the art, and it has the benefit of creating another logical version of stored data without requiring that the data be duplicated, such as by copying to another volume or device. Example uses of encapsulation include transitioning a storage volume into network virtualized storage to gain certain benefits thereof, such as inter-array replication, application transparent data mobility, and flexibility in the quality of service provided for a volume. In the presently disclosed technique, encapsulation can be used for purposes of data migration, i.e., moving a data set from one storage device/volume to another.

As mentioned above, one issue in the SP-tenant arrangement such as that of FIG. 1 is the management of SP-provided resources that are in some way visible to the host 10. Transitioning storage resources among different devices or volumes, such as by encapsulation or migration, is one example. In a conventional environment having a single owner/operator of an entire data center, it is generally possible to coordinate any action required on the host 10 with action being taken in the storage system 12 (although even in this case there may be organizational issues, especially in large organizations). In the SP-tenant environment, there is a greater expectation that the SP 22 operates independently of the tenant 20, without interfering with or otherwise burdening the tenant 20 and the operation of the host 10. As described more below, an automated process for encapsulation and de-encapsulation of volumes promotes this independence by enabling the SP 22 to take actions without requiring involvement of the tenant 20, other than deployment of certain automation functionality on the host 10 as described below.

Figure 2:
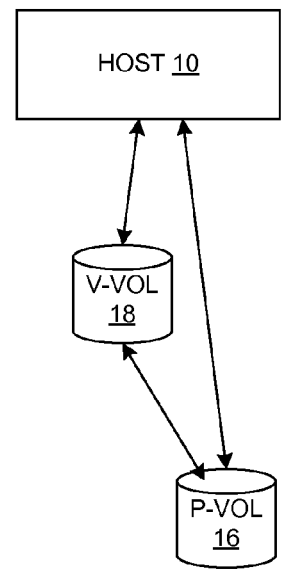
FIG. 2 is a schematic diagram of connections between a host computer and storage volumes.

FIG. 2 depicts logical connections between the host 10 and the volumes 16, 18. The host 10 has access to both devices at the same time, but in the case of encapsulation, the host 10 starts out using the physical volume 16 directly. When the virtual volume 18 is presented to the host 10, it is in a not ready device state, so reads/writes cannot go to both devices at the same time. In the case of de-encapsulation, the host starts out using the virtual volume 18 directly. Before the physical volume 16 is presented to the host 10, a setup operation is performed that puts access control in place so that the physical volume 16 cannot be accessed above the level of an internal filter driver of the host 10 (see FIG. 4 described below). Once that is in place, then it is safe to present 16 to the host. This aspect of operation is described in the above-referenced U.S. Pat. No. 8,332,613 of Glade et al.

Figure 3:
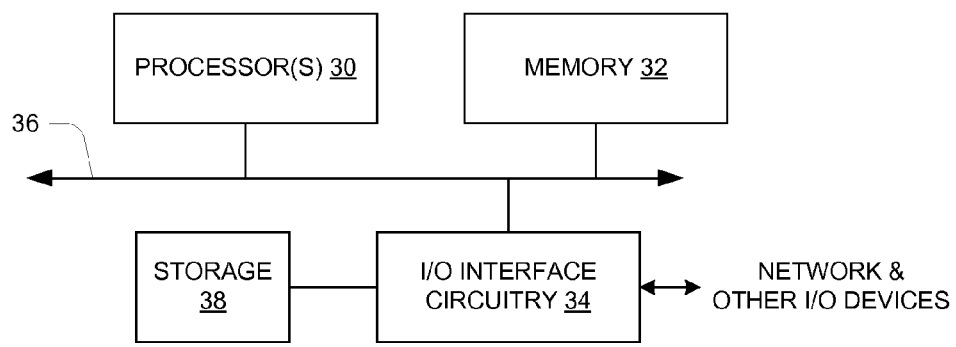
FIG. 3 is a block diagram of a computer from a hardware perspective.

FIG. 3 shows an example configuration of a physical computer such as a host 10 from a computer hardware perspective. The hardware includes one or more processors 30, memory 32, and I/O interface circuitry 34 interconnected by data interconnections 36 such as one or more high-speed data buses. The interface circuitry 34 provides a hardware connection to the SAN 14 (FIG. 1) and perhaps other external devices/connections (OTHER I/O DEVICES). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of an encapsulation application, such as described below, can be referred to as an encapsulation circuit or encapsulation component, and it should be understood that a collection of such circuits or components can all be realized and interact with each other as one or more sets of computer processing hardware executing different computer programs as generally known in the art.

FIG. 4 shows components of the host 10 from a software perspective, i.e., software-implemented functional components. It includes an application program (APPLICATION) 40 and an operating system (O/S) 42 that includes a filter driver 44 having a data migration extension (DM EXT). Also included is a migration agent 46.

In operation, as generally known the application 40 generates high-level commands for reading or writing secondary-storage data, typically invoking a function or library of the O/S 42. In this context, even certain system components such as a file system of a host 10 may be viewed as an application 40, translating file-oriented I/O of user applications to corresponding device-oriented I/O to the storage system 12. The filter driver 44 performs a variety of functions in connection with the I/O from the O/S 42, including managing the processing and transfer of storage commands and data between the host 10 and storage system 12. In the present technique the filter driver 44 includes added functionality in the form of a data migration extension that can perform kernel-level operations in support of data migration used at the system level. In one embodiment the filter driver 44 has structure and functionality similar to that described in above-mentioned Glade et al. patent, with the addition of automation of encapsulation and de-encapsulation as described herein.

The filter driver 44 has the ability to change the "name" or presentation of a storage device in the I/O stack of the host 10 from how it is presented at the bottom of the driver 44 to how it is presented out the top. Consider specifically a multi-pathing driver. It sees a set of path devices that all lead to the same storage device. It can create a "pseudodevice" that represents that single storage device and collect all the path devices within it. During operation as described below there is a remapping step that happens during a "commitment" where the name the application is using, presented by the filter driver up as a pseudodevice, is remapped to point to the target of a migration (or an encapsulation or de-encapsulation). A detailed explanation of this operation is included in the above-referenced U.S. Pat. No. 7,904,681 of Bappe et al. Pseudodevices are one mechanism for accomplishing such renaming.

The migration agent 46 is a component operating above the kernel level in the host 10. For example, it might operate in user space, or it may be part of a special control virtual machine in a virtual-computing environment. It may execute as a daemon process for example. Its task is to respond to certain events as may be signaled to it by the filter driver 44 or in other ways, according to logic for encapsulation and/or de-encapsulation processes as described herein. Aspects of this operation are included in the description below.

FIGS. 5 and 6 show example configurations of the storage system 12. A first type of system 12-1 (FIG. 5) includes a physical housing for physical storage devices (e.g., magnetic or Flash disk drives) referred to as an "array" 50-1, as well as a separate component shown as an "appliance" 52. The array 50-1 presents the physical volume 16 to both the host 10 and the appliance 52 via the SAN 14, and the appliance 52 presents the virtual volume 18 to the host 10 via the SAN 14. The appliance 52 may include higher-level storage functionality of known appliance devices deployed in SANs, for example as software-implemented functionality co-residing with switching and related functionality in a SAN switch. One example of a known appliance device is a SAN switch including a storage processor executing storage virtualization software such as Invista® or VPLEX® storage virtualization software of EMC Corporation. In the presently disclosed technique, the appliance 52 provides additional functionality related to encapsulation as described below. Also, it will be appreciated that the connection between the array 50-1 and appliance 52 in FIG. 5 could be via a separate SAN instance.

FIG. 6 shows a second type of system 12-2 in which an array 50-2 provides the higher-level encapsulation functionality (including the virtual volume 18) as well as the underlying physical storage represented by physical volume 16. In this case, the connection between the virtual volume 18 and the physical volume 16 will typically be made internally, as indicated by line 54.

Figure 7:
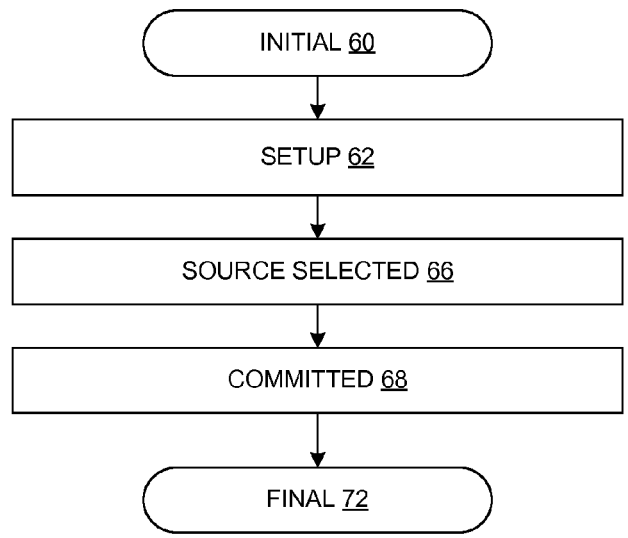
FIG. 7 is a diagram of states used by a migration mechanism for each specific migration.

FIG. 7 is a diagram of states used by the migration mechanism. During encapsulation, there are controlled transitions between different stages in the encapsulation process, using among other things functionality of the filter driver 44 and migration agent 46 (FIG. 4). The stages are referred to as "states." Changing from one state to another state is referred to as a "state transition." Arrows in FIG. 7 represent state transitions that occur during encapsulation. The conditions and stimuli for these transitions are described below. Also in the description of encapsulation below, the terms "source" and "target" are used to refer to the physical volume 16 and virtual volume 18 respectively.

The process shown in FIG. 7 is also used for de-encapsulation, as described more particularly further below. During de-encapsulation, the identifications for "source" and "target" are switched—they refer to the virtual volume 18 and the physical volume 16 respectively.

For the encapsulation process, initial state 60 of FIG. 7 is a state that exists prior to encapsulation operation. In this state, the host 10 is accessing the physical volume 16 in a normal manner based on application I/O. The I/O commands and responses are processed through filter driver 44.

In the setup state 62, the encapsulation of the physical volume 16 by the virtual volume 18 has occurred, and the encapsulation has been checked and confirmed (e.g., by the migration agent 46). The encapsulation may be done by a separate process such as those used by the above-mentioned Invista® and VPLEX® software. In the encapsulation the virtual volume 18 is put into a "not ready" device state and is then configured to the host 10. This is described more below. The detection of the "not ready" virtual volume 18 that encapsulates the physical volume 16 triggers a setup operation automatically that results in entry into the setup state 62. During the setup operation, access control is applied to the target of the migration (virtual volume 18). Immediately after the setup operation a synchronize (sync) operation is performed. This operation changes the device state to a "protected" device state (also described below) and results in the encapsulation moving to the source selected state 66.

In the source selected state 66, current operation continues (i.e., applications access the physical volume 16 and not the virtual volume 18).

A commit operation moves the state of the encapsulation to committed 68. Before the state change, several other actions are performed by the commit operation, including changing access control (to apply to the source and not the target) and a name remapping. Also this operation changes the device state of the virtual volume 18 to a "normal" device state, described below. In committed state 68, application I/O is now directed to the virtual volume 18 as encapsulating the data stored on the physical volume 16. The host 10 still has knowledge of and configuration for the physical volume 16, but access control applied during the commit operation is used to prevent normal application access to it.

Final state 72 is reached after a cleanup operation is performed. Part of cleanup is to verify that the physical volume 16 is no longer accessible to the host. The operations are described more fully below.

For the de-encapsulation process, the same progression of states as in FIG. 7 occurs but by different actions and reflecting different present operating conditions than those discussed above. De-encapsulation is described more fully below.

The states illustrated in FIG. 7 can be related to the logical connections illustrated in FIG. 2. In the case of encapsulation, in the initial state 60, the direct connection between host 10 and physical volume 16 exists, but the respective connections between the host 10 and virtual volume 18 and between the virtual volume 18 and the physical volume 16 do not exist. Then in the final state 72, the situation is reversed—the direction connection between host 10 and physical volume 16 no longer exists, and the respective connections between the host 10 and virtual volume 18 and between the virtual volume 18 and the physical volume 16 now exist. The reverse transition occurs for de-encapsulation, i.e., initial existing connections between the host 10 and virtual volume 18 and between the virtual volume 18 and the physical volume 16 are replaced by a direct connection between host 10 and a physical volume 16.

Figure 8:
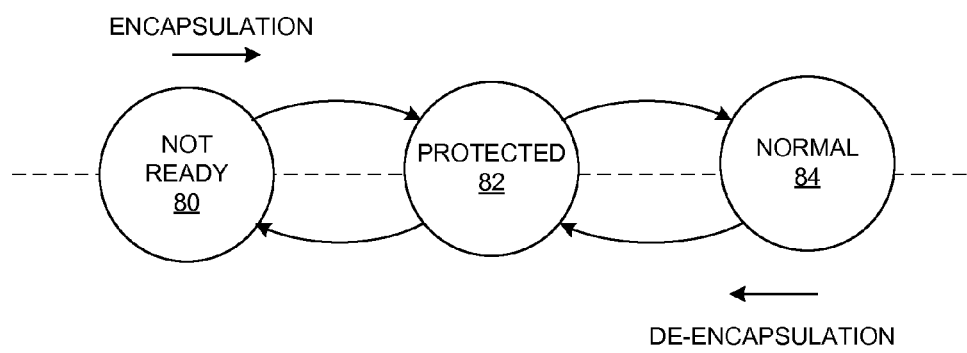
FIG. 8 is a state diagram of device state transitions during encapsulation as well as de-encapsulation.

FIG. 8 illustrates a sequence of device states of the virtual volume 18 for both the encapsulation process (left to right in FIG. 8) and de-encapsulation process (right to left). During encapsulation, the device state is initially Not Ready 80, meaning that application I/O cannot be performed to it. Any attempted read/write I/O will fail. The device state progresses to Protected 82, in which the device is capable of performing I/O operations and the encapsulation mechanism keeps the device from being accessible above the driver using access control. This device state may serve a signaling function as described below. The final device state is Normal 84—the device is capable of and accessible for normal application I/O.

During de-encapsulation, the flow is in the reverse direction as shown. The migration agent 46 changes the device state to Protected 82 during the sync operation, and that device state of the virtual volume 18 means it is okay for the admin to move to commit the de-encapsulation. The commit operation causes the device state of the virtual volume 18 to become Not Ready 80, which makes it safe to go through the cleanup operation as well, because the Not Ready device state 80 prevents read/write access to the virtual volume 18 and makes it okay to remove access control.

Figure 9:
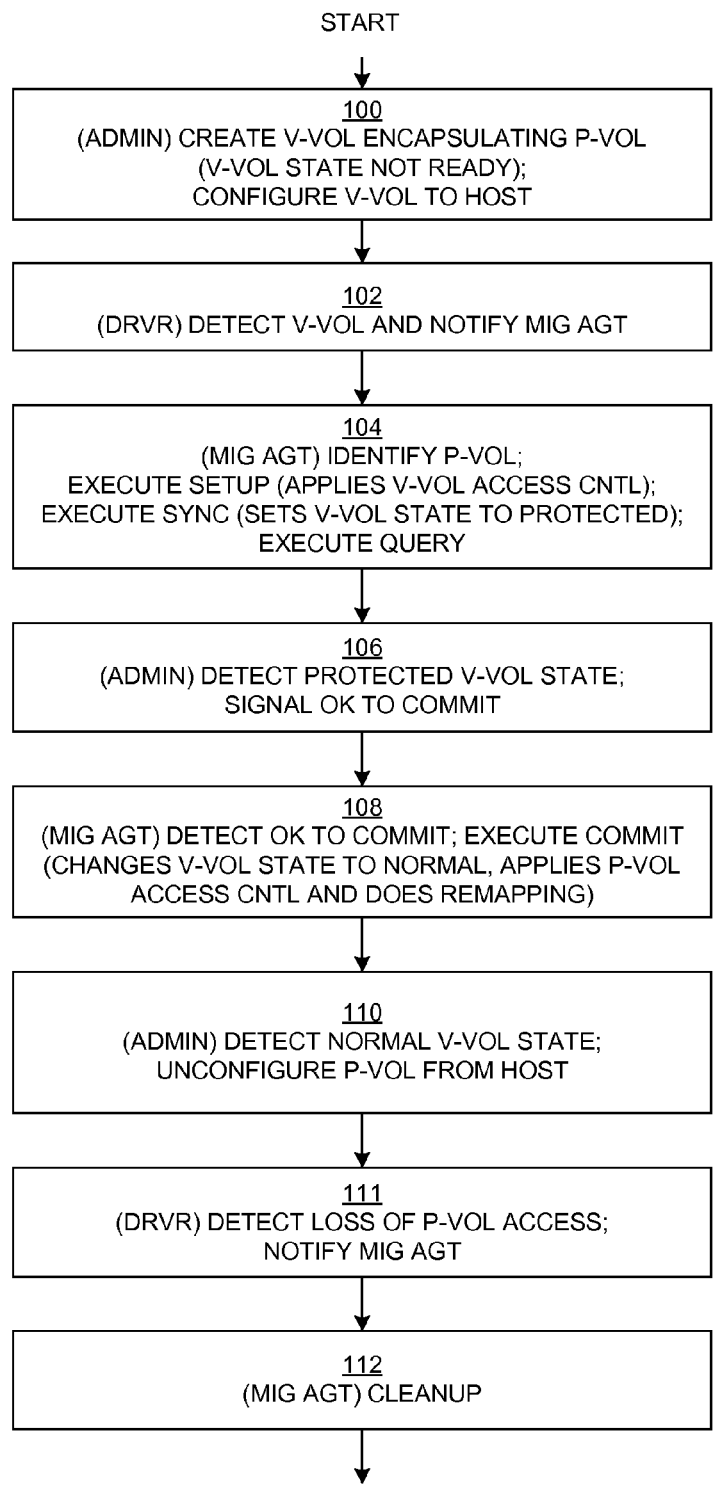
FIGS. 9 and 10 are flow diagrams for encapsulation and de-encapsulation processes respectively.

FIG. 9 illustrates the encapsulation process.

At 100, an SP administrator creates the encapsulating virtual volume 18, which encapsulates 16 and is created in the Not Ready device state 80 (FIG. 8). The SP administrator also configures the virtual volume 18 to the host 10.

At 102, the virtual volume 18 is detected by the filter driver (DRVR) 44 (not necessarily by the DM extension in particular) and the driver 44 notifies the migration agent 46, such as by sending an event. The agent 46 has a thread that is waiting for events. This specific event would be labeled or carry some specific identifying information, as there are other events that the driver 44 might send to the migration agent 46.

At 104, upon receiving the notification the migration agent 46 uses in-band commands to find out what physical device is encapsulated by the virtual volume 18. Once it identifies the encapsulated physical device 16 it performs setup and sync operations. The setup operation creates a migration for the 16, 18 pair. In the filter driver 44, this causes access control to be applied to the virtual volume 18. Sync causes the device state of the virtual volume 18 to be set to the Protected device state 82. The migration agent 46 also executes a 'query' operation to cause the transition to the Source Selected state 66 for the migration.

At 106, the SP administrator detects that the virtual volume 18 is in the Protected device state 82. When the admin is ready to commit, she signals to the migration agent 46 that it is OK to commit. This signaling may be done in a variety of ways, including both in-band as well as out-of-band, as described more below.

At 108, the migration agent 46 responds to the signal by performing a commitment operation which includes changing the device state of the virtual volume 18 to Normal 84 and changing the access control so that the physical volume 16 cannot be accessed but the virtual volume 18 can be. This operation also includes remapping the device names as briefly described above and more fully described in the above-referenced U.S. Pat. No. 7,904,681.

At 110, the SP administrator detects that the virtual volume 18 is in the Normal device state 84 and unconfigures the physical volume 16 from the host 10. At 111, the loss of access to the physical volume 16 is automatically detected by the filter driver 44 (not necessarily the DM extension) and the driver 44 notifies the migration agent 46 (possibly using an event, as described above).

At 112, upon receiving the notification the migration agent 46 executes a cleanup operation in the migration which verifies that the physical volume 16 is no longer connected to the host 10 and removes the migration pair 16, 18 as subjects of any active migration.

As mentioned, the signaling at 106 may be performed in a variety of ways. There may be some separate communication channel, not shown in the Figures, by which an explicit communication is conveyed from the SP admin to the migration agent 46. This may be seen as an example of an out-of-band communication. An in-band communication would occur using the same connection used for I/O between the host 10 and the virtual volume 18 (also referred to as the "datapath"). In the device state sequence of FIG. 8, it is assumed that there is some separate communication mechanism, whether in-band or out-of-band, for at least some of the signaling (see step 106 in FIG. 9 and steps 120, 128 in FIG. 10 described below). In an alternative described below, the device state sequence includes additional device state transitions providing additional in-band communications.

Figure 10:
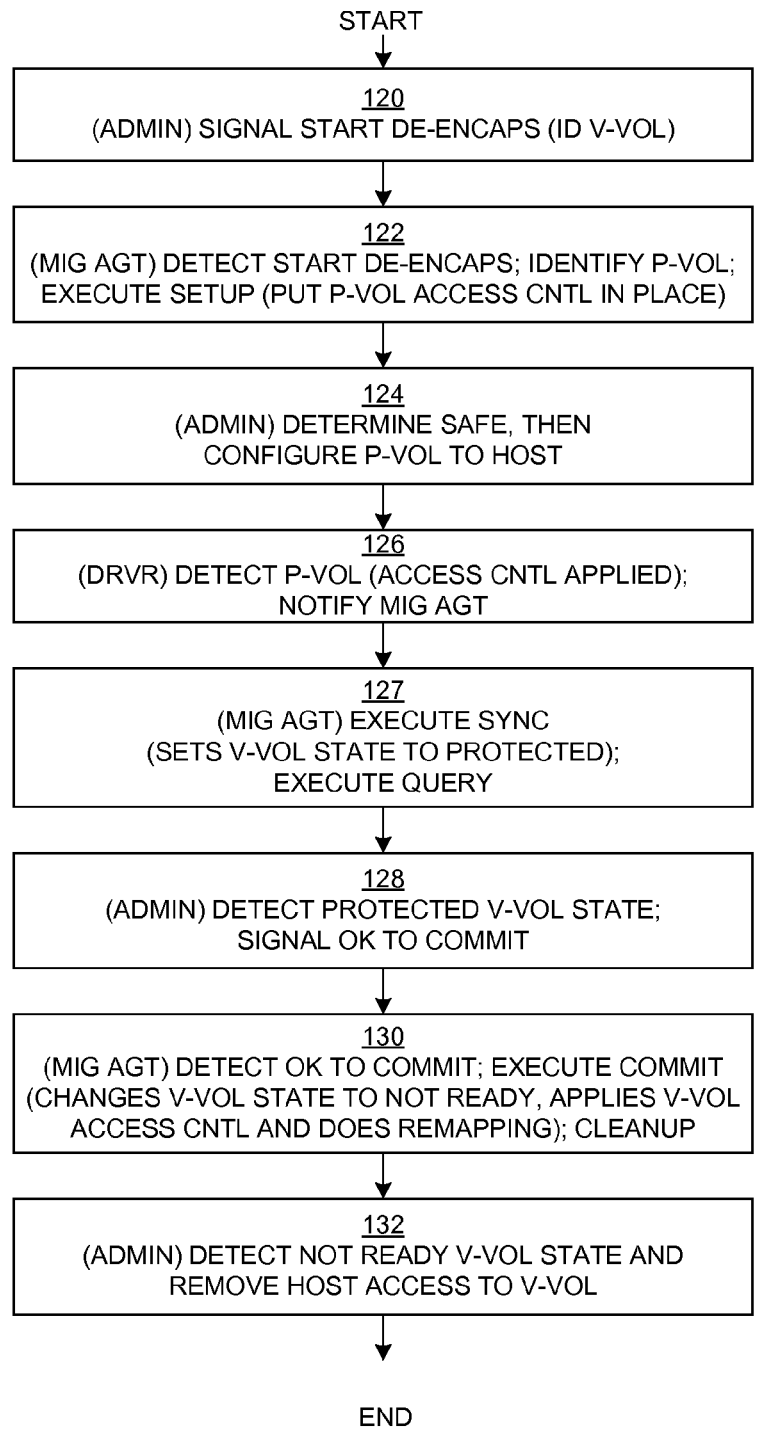

FIG. 10 illustrates the de-encapsulation process.

At 120, the SP administrator signals to start the de-encapsulation. The signal includes an identification of the device (virtual volume 18) to de-encapsulate.

At 122, upon receiving the signal, the migration agent 46 queries to find the underlying physical device 16, as in encapsulation, and then initiates the migration with a setup operation of the 18,16 pair. The transition to setup 62 (FIG. 7) puts access control on the physical device 16 (even though it is not yet configured to the host 10). It is noted that the physical device 16 cannot be put in a not-ready device state, as that would cause failure of read/write IOs coming through the virtual volume 18.

At 124, the SP administrator detects that it is safe to configure the physical volume 16 to the host, and then does so. In one embodiment this detection occurs by signaling in conjunction with completion of the setup operation by the migration agent 46. For example, there may be a reverse signal from the migration agent 46 to the SP administrator. Alternatively, the SP administrator might use an out-of-band communication channel to poll whether the setup state 62 has been achieved; this approach might work well for at least the out-of-band case.

In an alternative embodiment, using implicit signaling, instead of requiring the SP administrator to find that the migration is in the setup state 62 or receive an explicit signal from the migration agent that it is safe to configure the physical volume, the setup operation could change the device state of the virtual volume 18 to a Safe for P-Vol device state that would tell the SP administrator, upon detection of this device state transition, to configure the physical device 16 to the host 10. This operation is described more below.

At 126, the device driver 44 detects the physical device 16 and notifies the migration agent 46. The driver 44 also automatically applies the access control that was put in place in step 122. At 127, the migration agent 46 detects that the physical device 16 is part of a de-encapsulation that is in setup state 62, and executes the sync operation. During this operation, the device state of the virtual volume 18 is changed to Protected 82. Once that's done, the migration agent 46 performs the query operation that causes the migration to transition to Source Selected 66.

At 128, the SP administrator sees that the device state of the virtual volume 18 is now Protected 82. When the SP administrator is ready she signals to the migration agent 46 that it is okay to commit.

At 130, upon receiving this signal, the migration agent 46 executes the commit operation that causes the transition to the commit state 68 for the migration. The commit operation causes the device name to be remapped, and access control is removed from the physical device 16 and placed on the virtual volume 18. The commit operation also changes the device state of the virtual volume 18 to Not Ready. After successfully executing the commit operation, the migration agent 46 also executes the cleanup operation which removes the migration pair 18, 16 as subjects of any active migration. This may be done automatically, or there could be a separate "okay to cleanup" signal from the SP administrator as part of step 132 below that would cause the cleanup to be performed. A separate signal from the SP administrator is not necessary here, because the Not Ready device state of the virtual volume 18 prevents it from being accessed for IO operations and, thus, it is safe to clean up the migration which removes access control on the virtual volume 18.

At 132, the SP administrator sees that the virtual volume 18 is in the Not Ready device state 80 and then removes it from the host configuration. The SP administrator also removes the encapsulation of the physical device 16, destroying the virtual volume 18 at that point.

Figure 11:
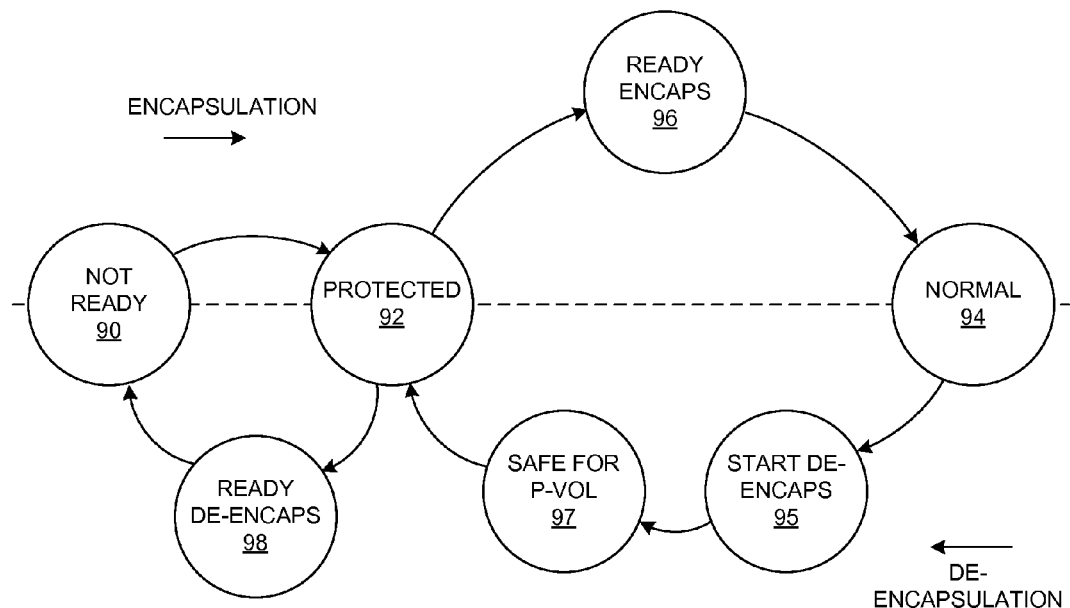
FIG. 11 is a state diagram of alternative device state transitions during encapsulation as well as de-encapsulation.

FIG. 11 illustrates another sequence of device states for encapsulation and de-encapsulation for an alternative embodiment in which there may be no explicit signaling directly between the SP administrator and the migration agent 46. In this approach, the migration agent 46 monitors and responds to the device state of the virtual volume 18, and the SP administrator changes the device state to implicitly notify the migration agent 46 when certain steps such as the commitment operation are to proceed. The monitoring is also in-band via the datapath between the host 10 and the virtual volume 18. Also in this embodiment, where a "reverse signal" is needed, such as during de-encapsulation at step 122 or 124, the SP administrator monitors the device state for a specific transition caused by the migration agent, as is done in other embodiments for other steps (e.g. step 110 or 128).

As shown, the processes employ a Not Ready device state 90, Protected device state 92 and Normal device state 94 similar to the corresponding device states in FIG. 8. It also includes a Ready Encaps device state 96 used during encapsulation, as well as a Start De-Encaps device state 95, Safe For P-Vol device state 97, and Ready De-Encaps device state 98 used during de-encapsulation.

The encapsulation process is as described above with reference to FIG. 9 except for signaling. At step 106 (FIG. 9) the SP administrator changes the device state from Protected 92 to Ready Encaps 96. The migration agent 46 is monitoring for this change and upon detecting it executes step 108, which transitions the device state to Normal 94.

The de-encapsulation process is similar to that described above with reference to FIG. 10. Step 120 is performed by the SP administrator changing the device state of the virtual volume 18 from Normal 94 to Start De-Encaps 95. The migration agent 46 is monitoring for this change and upon detecting it executes step 122. It then signals by changing the device state to Safe For P-Vol 97, which is detected by the SP administrator at 124. The device state is changed to Protected at step 127 as described above. At step 128 the SP administrator signals that it is OK to commit by changing the device state from Protected 92 to Ready De-Encaps 98. The migration agent 46 is monitoring for this change and upon detecting it executes step 130.

The encapsulation and de-encapsulation methods may have a variety of system uses. Generally, encapsulation provides the benefit of hiding physical-layer details under the virtual volume 18, so actions can be taken in a manner invisible to the host 10.

Figure 12:
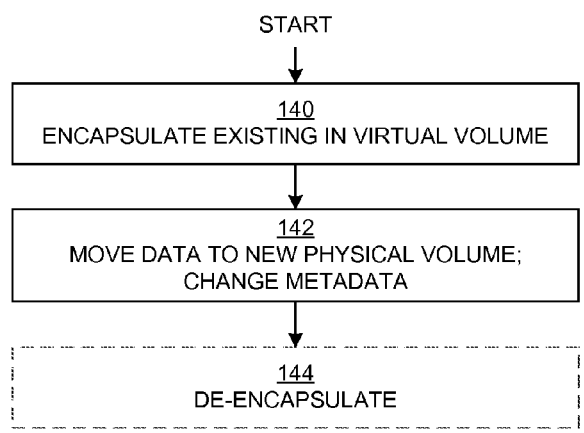
FIG. 12 is a flow diagram of a data migration process employing encapsulation and optionally de-encapsulation as well.

FIG. 12 shows one example use, which is a migration operation to move data from one volume to another in a manner that is non-disruptive and automated at the host 10, requiring no action from a tenant or other host administrator. Data may be moved for a variety of reasons, as generally known in the art, including for example a "technology refresh" in which older storage equipment is being replaced or augmented with newer equipment (e.g., higher performance disk drives). Another example is load balancing between different storage systems (12) in a data center. In this case data is moved in order to relieve an overly busy storage system by placing the data on a less busy storage system.

At step 140, an existing physical volume 16 is encapsulated in a virtual volume 18, for example using the encapsulation process described above. At this point, the host 10 interacts only with the virtual volume 18, and it is not exposed to the details by which the data is written to and read from the existing physical volume 16. Then at step 142, the storage system 12 itself moves the data from the existing physical volume 16 to a new physical volume and modifies metadata of the virtual volume 18 to reflect that it now encapsulates the new physical volume. Operation can actually continue in this configuration indefinitely, if there are reasons for doing so or at least no reasons for making further change. Alternatively, an optional step 144 may be used to now de-encapsulate the virtual volume 18, for example using the de-encapsulation process described above. At this point the host 10 accesses the new physical volume for the data set previously stored on the existing physical volume 16 previously encapsulated by the virtual volume 18.

The data migration operation can be performed in both types of storage system configurations shown in FIGS. 5 and 6. The on-array configuration/operation of FIG. 6 may be required in environments lacking an off-array appliance 52 or in which the data is being moved from one device to another in the same array 50. One example use case is an array 50 making some kind of identity change for the volume, for instance, to support new features that the old identity can't support. The appliance-based configuration/operation of FIG. 5 may provide more power and flexibility in systems that support it. In some cases, for some hosts, the migration agent 46 might need to help automate the configuration and unconfiguration of new devices to the host. Some operating systems do this without any commands being run, but some need explicit commands, so at the configuration steps there would be a signal to the migration agent 46 to do a device scan and also run any commands that the filter driver 44 might need to detect new devices. A similar step might be needed at a time of device unconfiguration.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a host computer, comprising:
in a first step, automatically detecting an encapsulating volume in a not ready device state and executing setup and synchronize operations, the encapsulating volume being a virtualization of a physical volume referenced by applications using a device name mapped thereto, the setup operation applying access control to the encapsulating volume to initially prevent application access to the encapsulating volume, the synchronization operation causing a transition of the encapsulating volume to a protected device state in which the encapsulating volume is ready for storage operations but the access control is maintained to continue preventing application access to the encapsulating volume; and
in a second step performed in response to a signal conveying an administrator's instruction to proceed, automatically executing a commitment operation by atomically (a) removing the access control on the encapsulating volume to allow application access thereto, (b) applying access control to the physical volume to prevent subsequent application access to the physical volume, and (c) remapping the device name to reference the encapsulating volume, the commitment operation also causing a transition of the encapsulating volume to a normal device state in which the encapsulating volume is available for normal application access.

2. A method according to claim 1, wherein the signal is an in-band signal provided to the host computer on a data path by which the host computer accesses the volumes.

3. A method according to claim 2, wherein the signal is conveyed by device state transitions of the virtual volume.

4. A method according to claim 1, further including, in a third step performed after the second step, executing a cleanup operation to verify that the physical volume is no longer connected to the host and to remove the physical volume and virtual volume as subjects of an active migration.

5. A method according to claim 4, wherein the third step is performed automatically upon detecting that host access to the physical volume has been removed.

6. A method according to claim 4, wherein the third step is performed in response to a cleanup signal received in the datapath from the storage administrator.

7. A method according to claim 1, wherein the first and second steps are steps of an encapsulation phase of a migration process by which data of the physical volume as a source physical volume is migrated to a target physical volume, the migration process including a data movement operation in which data of the source physical volume is non-disruptively copied to the target physical volume during ongoing application access to the virtual volume and the virtual volume then becomes identified as encapsulating the target physical volume, and further including steps of a de-encapsulation phase of the migration process involving the virtual volume as a source virtual volume and the target physical volume, the de-encapsulation process including:
in a third step performed in response to a signal conveying the administrator's de-encapsulation instruction, identifying the target physical volume as being encapsulated by the virtual volume and executing a setup operation, the setup operation creating access control for the target physical volume;
in a fourth step performed automatically in response to detecting the target physical volume becoming configured to the host, applying the access control to the target physical volume and performing a synchronization operation causing a transition of the virtual volume to a protected device state; and
in a fifth step performed in response to a signal conveying the administrator's instruction to proceed, automatically executing a commitment operation by atomically (a) removing the access control on the target physical volume to allow application access thereto, (b) applying access control to the source virtual volume to prevent subsequent application access to the source virtual volume, and (c) remapping the device name to reference the target physical volume, the commitment operation also causing a transition of the source virtual volume to a not ready device state in which the encapsulating volume is unavailable for normal application access.

8. A method according to claim 7, wherein the encapsulation and de-encapsulation processes are performed as part of a data migration operation by which the source physical volume is functionally replaced by the target physical volume in system operation.

9. A method according to claim 8, wherein the source physical volume and target physical volume are in different storage sub-systems, and wherein a separate storage appliance coupled to the storage sub-systems provides storage virtualization functionality for establishing, managing and using the virtual volume.

10. A method according to claim 7, wherein the signal conveying the administrator's de-encapsulation instruction and the signal conveying the administrator's instruction to proceed are in-band signals provided to the host computer on a data path by which the host computer accesses the volumes.

11. A method according to claim 10, wherein the signals are conveyed by device state transitions of the virtual volume.

12. A method according to claim 7, wherein executing the setup operation is accompanied by signaling to the administrator that it is safe to configure the target physical volume to the host.

13. A method according to claim 12, wherein the signaling includes an explicit signal sent from the host to the administrator upon completion of the setup operation.

14. A method according to claim 11, wherein the signaling is accomplished by the administrator polling the host for completion of the setup operation.

15. A method according to claim 12, wherein the signaling is accomplished by causing a predetermined device state transition of the virtual volume.

16. A method according to claim 7, further including, in a sixth step performed after the fifth step, executing a cleanup operation to remove the physical volume and virtual volume as subjects of an active migration.

17. A method according to claim 16, wherein the sixth step is performed automatically upon completion of the fifth step.

18. A method according to claim 1, wherein the source physical volume and target physical volume both reside in a disk array enclosure housing a storage processor, and wherein the storage processor provides storage virtualization functionality for establishing, maintaining and using the virtual volume.

19. A non-transitory computer-readable medium storing computer program instructions, the instructions being executable by a host computer to cause the host computer perform a method including:
   in a first step, automatically detecting an encapsulating volume in a not ready device state and executing setup and synchronize operations, the encapsulating volume being a virtualization of a physical volume referenced by applications using a device name mapped thereto, the setup operation applying access control to the encapsulating volume to initially prevent application access to the encapsulating volume, the synchronization operation causing a transition of the encapsulating volume to a protected device state in which the encapsulating volume is ready for storage operations but the access control is maintained to continue preventing application access to the encapsulating volume; and
   in a second step performed in response to a signal conveying an administrator's instruction to proceed, automatically executing a commitment operation by atomically (a) removing the access control on the encapsulating volume to allow application access thereto, (b) applying access control to the physical volume to prevent subsequent application access to the physical volume, and (c) remapping the device name to reference the encapsulating volume, the commitment operation also causing a transition of the encapsulating volume to a normal device state in which the encapsulating volume is available for normal application access.

20. A non-transitory computer-readable medium according to claim 19, wherein the first and second steps are steps of an encapsulation phase of a migration process by which data of the physical volume as a source physical volume is migrated to a target physical volume, the migration process including a data movement operation in which data of the source physical volume is non-disruptively copied to the target physical volume during ongoing application access to the virtual volume and the virtual volume then becomes identified as encapsulating the target physical volume, and wherein the method performed by execution of the instructions further includes steps of a de-encapsulation phase of the migration process involving the virtual volume as a source virtual volume and the target physical volume, the de-encapsulation process including:
   in a third step performed in response to a signal conveying the administrator's de-encapsulation instruction, identifying the target physical volume as being encapsulated by the virtual volume and executing a setup operation, the setup operation creating access control for the target physical volume;
   in a fourth step performed automatically in response to detecting the target physical volume becoming configured to the host, applying the access control to the target physical volume and performing a synchronization operation causing a transition of the virtual volume to a protected device state; and
   in a fifth step performed in response to a signal conveying the administrator's instruction to proceed, automatically executing a commitment operation by atomically (a) removing the access control on the target physical volume to allow application access thereto, (b) applying access control to the source virtual volume to prevent subsequent application access to the source virtual volume, and (c) remapping the device name to reference the target physical volume, the commitment operation also causing a transition of the source virtual volume to a not ready device state in which the encapsulating volume is unavailable for normal application access.

* * * * *